United States Patent
Takagi et al.

(10) Patent No.: US 9,215,167 B2
(45) Date of Patent: Dec. 15, 2015

(54) NETWORK SYSTEM

(75) Inventors: Kazuo Takagi, Tokyo (JP); Hiroshi Tanaka, Tokyo (JP); Itaru Nishioka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 96 days.

(21) Appl. No.: 14/343,982

(22) PCT Filed: Sep. 6, 2012

(86) PCT No.: PCT/JP2012/072767
§ 371 (c)(1),
(2), (4) Date: Mar. 10, 2014

(87) PCT Pub. No.: WO2013/038987
PCT Pub. Date: Mar. 21, 2013

(65) Prior Publication Data
US 2014/0219285 A1   Aug. 7, 2014

(30) Foreign Application Priority Data

Sep. 14, 2011   (JP) ................................ 2011-200294

(51) Int. Cl.
*H04L 12/28* (2006.01)
*H04L 12/717* (2013.01)
*H04L 12/725* (2013.01)
*H04M 7/00* (2006.01)

(52) U.S. Cl.
CPC ............ *H04L 45/42* (2013.01); *H04L 45/3065* (2013.01); *H04M 7/006* (2013.01)

(58) Field of Classification Search
CPC ...... H04L 45/42; H04L 45/3065; H04L 7/006
USPC ........................................................ 370/400
See application file for complete search history.

(56) References Cited

U.S. PATENT DOCUMENTS

2004/0184483 A1* 9/2004 Okamura et al. ............. 370/477
2004/0202158 A1* 10/2004 Takeno et al. ................ 370/389

FOREIGN PATENT DOCUMENTS

| JP | 2002-64554 A | 2/2002 |
| JP | 2009-55357 A | 3/2009 |
| JP | 2010-103780 A | 5/2010 |
| WO | 2011079962 A1 | 7/2011 |

OTHER PUBLICATIONS

International Search Report for PCT Application No. PCT/JP2012/072767, mailed on Oct. 2, 2012.
Farrel Old Dog Consulting J-P Vasseur CISCO Systems A et al: "A Path Computation Element (PCE)-Based Architecture; rfc4655.txt". Aug. 1, 2006.
Loa Andersson et al: "MPLS-TP Control Plane Framework; draft-ietf-ccamp-mpls-tp-cp-framework-03 .txt", No. 3, Oct. 15, 2010, pp. 1-54.
Extended European Search Report of EP Application No. 12831393.9 dated Mar. 18, 2015.

* cited by examiner

*Primary Examiner* — Sai-Ming Chan

(57) ABSTRACT

A network system includes a signaling network configured to perform signaling information exchange with client nodes, determine a data information transfer route, and generate setting information, and a data network configured to construct the data information transfer route according to the setting information from the signaling network and perform data exchange between the client nodes.

10 Claims, 7 Drawing Sheets

NETWORK SYSTEM

This application is a National Stage Entry of PCT/JP2012/072767 filed on Sep. 6, 2012, which claims priority from Japanese Patent Application 2011-200294 filed on Sep. 14, 2011, the contents of all of which are incorporated herein by reference, in their entirety.

TECHNICAL FIELD

The present invention relates to a network system. In particular, the present invention relates to a network system which performs data exchange between nodes connecting client nodes.

BACKGROUND ART

With the rapid increase of packet-based traffic due to the acceleration of Internet Protocol (IP) for communication services, the introduction of a router network using routers for the purpose of efficiently accommodating such traffic is in progress. A representative example of a router network is disclosed in Patent Document 1. However, because the cost of the router network is high, the introduction of a network configured to cut through a router using a lower layer switch (for example, a multi-protocol label switch-transport profile (MPLS-TP)) for cost reduction is also in progress.

A network configuration including a router and a transmission device of the related art is illustrated in FIG. 7. The network of the related art includes routers 710-1 to 710-4 and transmission devices 720-1 to 720-4.

Data paths 730 to 735 are assumed to be set up in advance between the transmission devices 720-1 to 720-4, and the routers 710-1 to 710-4 are connected in a star shape via the data paths 730 to 735. A description will be given under the assumption that two arbitrary routers among the routers 710-1 to 710-4 all have an adjacent relation.

Because the routers 710-1 to 710-4 construct a data packet transfer route before data packet transfer, signaling circuits 711-1 to 711-4 start up a signaling protocol. The signaling circuits 711-1 to 711-4 transmit signaling information including IP address information (routing information) that they are capable of transferring to adjacent routers as signaling packets to the connected transmission devices 720-1 to 720-4 via switches 713-1 to 713-4. Upon packet delivery, the switches 713-1 to 713-4 assign medium access control (MAC) addresses of the destination adjacent routers 710-1 to 710-4 as transmission destination MAC addresses.

The transmission devices 720-1 to 720-4 refer to a transmission destination MAC address of an input signaling packet and select one of data transfer paths 730 to 735 corresponding to the transmission destination MAC addresses from their MAC-path mappers 721-1 to 721-4. After predetermined frame conversion has been performed in the switches 722-1 to 722-4, frame conversion results are transferred to the desired data paths 730 to 735.

After predetermined frame conversions have been performed on data from the data paths 730 to 735 in the switches 722-1 to 722-4, the transmission devices 720-1 to 720-4 extract packets and transfer the extracted packets to the routers 710-1 to 710-4 according to the MAC addresses of the packets.

The signaling circuits 711-1 to 711-4 of the routers 710-1 to 710-4 receiving signaling protocols from the transmission devices 720-1 to 720-4 construct relations between transmission destination IP addresses and the next transfer routers from routing information.

For example, when the router 710-1 receives the routing information capable of being transferred when one higher-order byte of an IP address from the router 710-2 is 0 to 100, the router 710-1 recognizes the next transfer destination router as the router 710-2 when one higher-order byte of a transmission destination IP address of the received data packet is 0 to 100.

Recognition results are registered in the routing tables 712-1 to 712-3. In the routing tables 712-1 to 712-3, output port information for a transfer destination IP address and a MAC address of the next transfer destination router are registered.

Thus, data packet transfer routes between the routers 710-1 to 710-3 are established before a data packet transfer.

Next, the data packet transfer will be described. It is assumed that a packet of a transmission destination IP address 10.1.1.1 is input from the router 710-1 and an output port 701 and a MAC address #710-2 of the next transfer destination router 710-2 are registered in the routing table 712-1 when one higher-order byte of the IP address is 0 to 100.

The data packet is input to the switch 713 of the router 710-1.

The switch 713 refers to the routing table 712-1 corresponding to the transmission destination IP address of the data packet and acquires information about the output port 701 and the MAC address #710-2 to be added. Thereafter, the MAC address #710-2 is added to the data packet and the data packet is output from the output port 701.

Upon receiving the data packet, the transmission device 720-1 refers to its transmission destination MAC address as in the signaling packet and selects the data transfer path 730 corresponding to the transmission destination MAC address #720-2 from its own MAC-path mapper 721-1. After the predetermined frame conversion has been performed in the switch 722-1, the frame conversion result is transferred to the desired data path 730.

After the transmission device 720-2 performs predetermined frame conversion on data from the data path 730 in the switch 722-2 and extracts a data packet, the data packet is transferred to the router 710-2 according to a MAC address of the data packet.

By means of the above, the data packet can be transmitted in the network of the related art including the router and the transmission device.

DOCUMENTS OF THE PRIOR ART

Patent Document

[Patent Document 1]
Japanese Unexamined Patent Application, First Publication No. 2002-064554

DISCLOSURE OF INVENTION

Problems to be Solved by the Invention

In general, because a router and a transmission device also perform data transfer, performance of a central processing unit (CPU) and the number of elements to be mounted are limited from the viewpoint of heat or size. Thus, it is not desirable to consume CPU power according to a signaling processing amount. In a network which cuts through the router, a star connection is established between routers, so that the number of adjacent routers increases. The signaling processing amount in the router is proportional to the number of adjacent routers. In the cut-through network, the number of adjacent routers increases, so that the signaling processing amount also increases.

Means for Solving the Problem

In order to solve the above-described problem, according to a first embodiment of the present invention, a network system performs data exchange between nodes connecting client nodes. This network system includes a signaling network configured to perform signaling information exchange with the client nodes, determine a data information transfer route, and generate setting information; and a data network configured to construct the data information transfer route according to the setting information from the signaling network and perform the data exchange between the client nodes.

According to a second embodiment of the present invention, a network system performs data exchange between nodes connecting client nodes. This network system includes a centralized control device configured to exchange signaling information with the client nodes, determine a data information transfer route, and generate setting information; and a transmission device configured to construct the data information transfer route according to the setting information from the centralized control device and perform the data exchange between the client nodes.

According to a third embodiment of the present invention, a network system performs data exchange between nodes connecting client nodes. This network system includes a centralized control device configured to exchange signaling information with the client nodes through a control path, determine a data information transfer route, and generate setting information; and a transmission device configured to set up the control path with the centralized control device, transmit the signaling information from the client node to the control path, construct a data path according to the setting information from the centralized control device received through the control path, transmit data from the client node using the data path, and transfer the signaling information and data information received from the control path and the data path to the client node.

According to a fourth embodiment of the present invention, a network system performs data exchange between nodes connecting client nodes. This network system includes a centralized control device including: a signaling circuit configured to exchange signaling information with the client node through a control path; a route/resource determination circuit configured to determine a data information transfer route and notify the signaling circuit of client setting information; and a path control circuit configured to provide notification of network setting information from the route/resource determination circuit through the control path; and a transmission device including: a configuration circuit configured to set the network setting information of the notification from the path control circuit of the centralized control device through the control path set up with the centralized control device; a data information-data path correspondence table registered from the configuration circuit; a mapping/demapping circuit configured to perform data information mapping and demapping between data information and a data path by referring to the data information-data path correspondence table; a path cross-connect element configured to perform a cross-connect operation on the control path and the data path based on setting from the configuration circuit; and a signaling separation/multiplexing circuit configured to separate the data information and the signaling information from the client node, transmit the signaling information to the control path, transmit the data information to the mapping/demapping circuit, and multiplex the signaling information from the control path and the data information from the mapping/demapping circuit to output the multiplexed information.

According to a fifth embodiment of the present invention, a network system performs data exchange between nodes connecting client nodes. This network system includes the client node including: a signaling circuit configured to exchange signaling information and acquire client setting information; a next-hop information addition circuit configured to add network information based on the setting information of the signaling circuit; and a switch configured to switch the data information and the signaling information from the signaling circuit, the next-hop information addition circuit, and a network input port; a centralized control device including: a signaling circuit configured to exchange the signaling information with the client node through a control path; a route/resource determination circuit configured to determine a data information transfer route and notify the signaling circuit of the client setting information; and a path control circuit configured to provide notification of network setting information from the route/resource determination circuit through the control path; and a transmission device including: a configuration circuit configured to set the network setting information of the notification from the path control circuit of the centralized control device through the control path set up with the centralized control device; a data information-data path correspondence table of the network setting information from the configuration circuit; a mapping/demapping circuit configured to perform data information mapping and demapping between the data information and the data path by referring to the data information-data path correspondence table; a path cross-connect element configured to perform a cross-connect operation on the control path and the data path based on setting from the configuration circuit; and a signaling separation/multiplexing circuit configured to separate the data information and the signaling information from the client node, transmit the signaling information to the control path, transmit the data information to the mapping/demapping circuit, and multiplex the signaling information from the control path and the data information from the mapping/demapping circuit to output the multiplexed information.

The above outlines of the embodiments according to the present invention do not include all the necessary characteristics of the present invention, and sub-combinations of groups of the characteristics can also be the invention.

Effect of the Invention

As apparent from the above description, according to the present invention, it is possible to reduce a signaling processing amount of each router.

EMBODIMENTS FOR CARRYING OUT THE INVENTION

Hereinafter, the present invention will be described through embodiments of the invention. However, the following embodiments are not intended to limit the present invention defined by the claims, and all the combinations of characteristics described in the embodiments are not necessarily required for a solution means of the invention.

Figure 1:
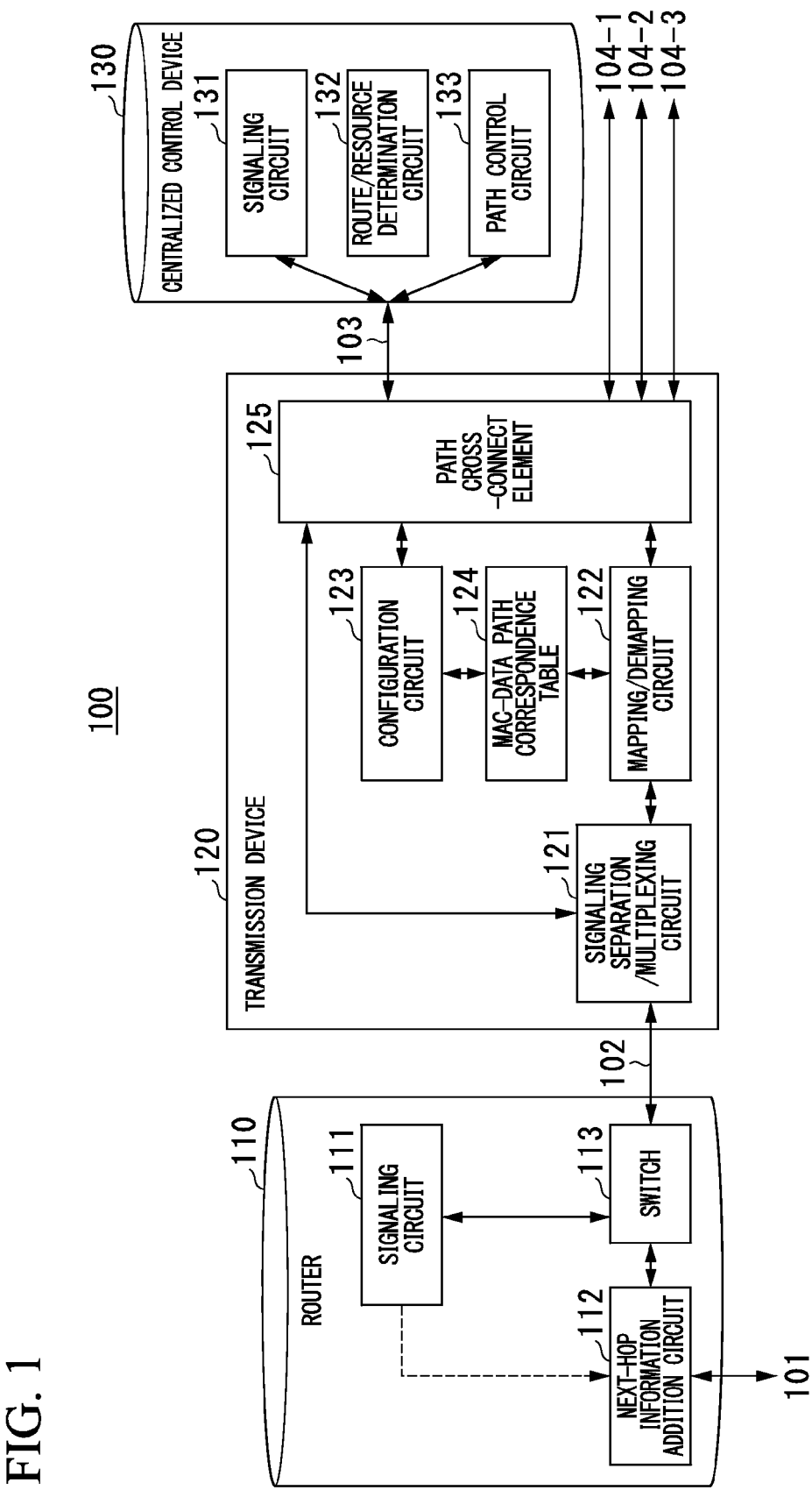
FIG. 1 is a diagram illustrating an example of a configuration of a network router according to a first embodiment of the present invention.

FIG. 1 is a diagram illustrating an example of a configuration of a network router 100 according to a first embodiment of the present invention. The network router 100 includes a router 110, a transmission device 120, and a centralized control device 130.

The router 110 includes a signaling circuit 111, a next-hop information addition circuit 112, and a switch 113.

The signaling circuit 111 manages control information such as route information and band information capable of being transferred by the router 110 and performs information exchange with a designated router/device using a designated signaling protocol. For example, an open shortest path first (OSPF) protocol or a border gateway protocol (BGP) is representative as the signaling protocol.

The next-hop information addition circuit 112 is a circuit configured to add information for designating the next transfer destination router of a received packet. In this first embodiment, a MAC address of the next transfer destination router interface is used as additional information.

The switch 113 outputs packets from the next-hop information addition circuit 112 and the signaling circuit 111 to desired ports.

The transmission device 120 includes a signaling separation/multiplexing circuit 121, a mapping/demapping circuit 122, a configuration circuit 123, a MAC-data path correspondence table 124, and a path cross-connect element 125.

The signaling separation/multiplexing circuit 121 separates/multiplexes a data packet and a signaling packet.

The mapping/demapping circuit 122 refers to the transmission destination MAC address of the data packet from the signaling separation/multiplexing circuit 121, performs the association with a desired data path, and performs frame conversion for performing a transfer on the path. In addition, a frame included in the data path transferred from the path cross-connect element 125 is converted and restored to the data packet and the data packet is transferred to the signaling separation/multiplexing circuit 121.

The configuration circuit 123 acquires configuration information from a control path transferred from the path cross-connect element 125 and sets the MAC-data path correspondence table 124 and the path cross-connect element 125.

The MAC-data path correspondence table 124 is a reference table in which the correspondence between the transmission destination MAC address and the data path is listed. The mapping/demapping circuit 122 refers to this table.

The centralized control device 130 includes a signaling circuit 131, a route/resource determination circuit 132, and a path control circuit 133.

The signaling circuit 131 terminates the signaling protocol from the router 110, collects route information and resource information of the router 110, and transfers the next transfer router information corresponding to the transmission destination IP address of the data packet to the router 110. The information is received from the route/resource determination circuit 132.

The route/resource determination circuit 132 sets route information and band information from a plurality of routers 110 and an optimum path route and resource allocation from a physical topology of the network of the transmission device 120. In addition, the transmission destination IP address of the data packet, the next transfer router information (the transmission destination MAC address in this example), and the correspondence between the next transfer router and the data path are determined. The signaling circuit 131 refers to the transmission destination IP address and the next transfer router information (transmission destination MAC address), and the path control circuit 133 refers to the path route information, the path resource information, and the correspondence information between the transmission destination MAC address and the data path.

The path control circuit 133 manages data path setup information and the correspondence between the transmission destination MAC address and the data path for every transmission device 120, and notifies the transmission device 120 of the information and the correspondence.

Figure 2:
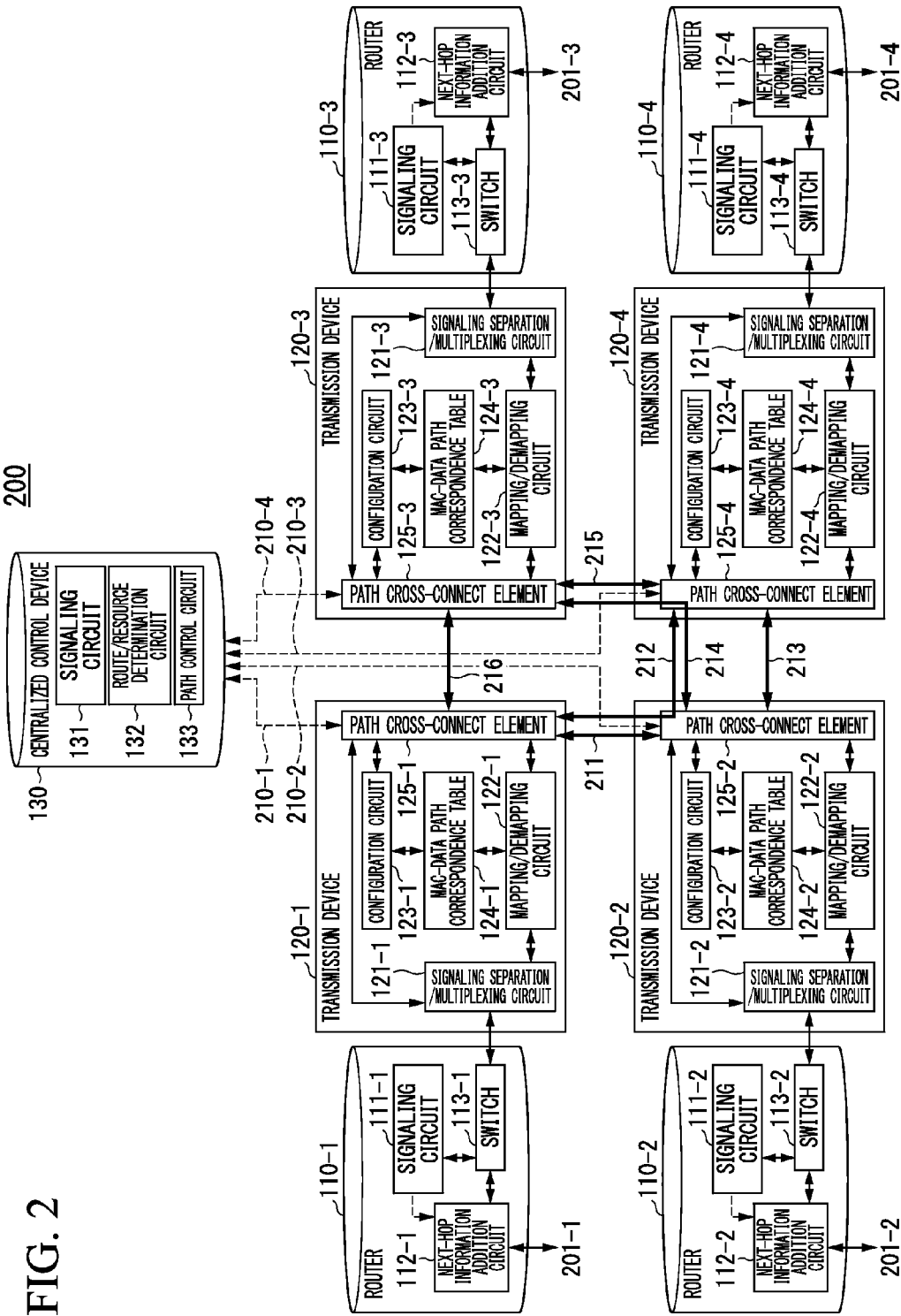
FIG. 2 is a diagram illustrating an example of a configuration of a network illustrating an operation of the network router according to the first embodiment of the present invention.

FIG. 2 is a diagram illustrating an example of a configuration of a network 200 illustrating an operation of the network router 100. The network 200 includes routers 110-1 to 110-4, transmission devices 120-1 to 120-4, and a centralized control device 130.

Control paths 210-1 to 210-4 are set up in advance between the transmission devices 120-1 to 120-4 and the centralized control device 130. To simplify description, data paths 211 to 216 are set up between the transmission devices 120-1 to 120-4. MAC addresses are assumed to be assigned to various types of packets output from the routers 110-1 to 110-4.

The routers 110-1 to 110-4 start up a signaling protocol for performing a transfer within the network router before a data packet transfer.

Signaling packets from the signaling circuits 111-1 to 111-4 of the routers 110-1 to 110-4 are transferred to the transmission devices 120-1 to 120-4 via the switches 113-1 to 113-4.

Thereafter, the signaling packets are separated by the signaling separation/multiplexing circuits 121-1 to 121-4 of the transmission devices 120-1 to 120-4. After the signaling packets have been converted into control path frames, the control path frames are transferred to the centralized control device 130 via the control paths 210-1 to 210-4 through path cross-connect elements 125-1 to 125-4.

The signaling packet reaches the signaling circuit 131 of the centralized control device 130 and therefore signaling protocol processing is performed between the signaling circuits 111-1 to 111-4 of the routers 110-1 to 110-4 and the signaling circuit 131 of the centralized control device. The route information and band information of the routers 110-1 to 110-4 included in the signaling information are transferred to the route/resource determination circuit 132.

The route/resource determination circuit 132 of the centralized control device 130 performs an optimum data path setup process based on the route/band information of the routers 110-1 to 110-4 collected via the transmission devices 120-1 to 120-4. It is possible to determine the next transfer router based on the transmission destination IP address of the data packet according to the route/band information collection.

For example, the notification of 0 to 100, the notification of 101 to 150, the notification of 151 to 200, and the notification of 210 to 255 are assumed to be provided from the routers 110-1, 110-2, 110-3, and 110-4, respectively, as IP prefixes (each serving as one higher-order byte of the IP address) capable of being transferred from their own routers. In this case, for the router 110-1, a transfer to the router 110-2 is determined if the IP prefix is 101 to 150, a transfer to the router 110-3 is determined if the IP prefix is 151 to 200, and a transfer to the router 110-4 is determined if the IP prefix is 210 to 256.

The route/resource determination circuit 132 can generate the next transfer router information and notify the routers 110-1 to 110-4 of a relation between the transmission destination IP address and the next transfer router through the signaling protocol of the signaling circuit 131.

As the next transfer router information, the notification of the IP addresses of the routers 110-1 to 110-4 and the notification of their MAC addresses may be provided.
An example in which the notification of the MAC addresses is provided will be described in the present invention. The MAC addresses of the routers 101-1 to 101-4 can be acquired from a transmission source MAC address of the frame when the signaling packet is received.

The path control circuit 133 acquires data path setup and MAC address-data path correspondence information from the route/resource determination circuit 132, and notifies the transmission devices 120-1 to 120-4 of the acquired information as configuration information. At this time, of course, the information is packetized and converted into a control path frame and the control path frame is transferred on the control paths 210-1 to 210-4.

The configuration information of the notification is transferred to the configuration circuits 123-1 to 123-4 via the path cross-connect elements 125-1 to 125-4 of the transmission devices 120-1 to 120-4.

The configuration circuits 123-1 to 123-4 extract the configuration information from a packet, and register or set data path setup and MAC address-data path correspondence information according to the extracted information in their own path cross-connect elements 125-1 to 125-4 and MAC-data path correspondence tables 124-1 to 124-4.

The routers 110-1 to 110-4 receive correlation information between a transmission destination IP address and a MAC address of the next transfer router information from the centralized control device 130 via the signaling protocol which operates in the signaling circuits 111-1 to 111-4.

The signaling circuits 111-1 to 111-4 register the correspondence between the transmission destination IP address and the transmission destination MAC address in the next-hop information addition circuits 112-1 to 112-4.

Thus, data packet transfer routes between the routers 110-1 to 110-4 are established before a data packet transfer.

Next, the data packet transfer will be described. Here, the router 110-2 is assumed to be the next transfer router (MAC address=#110-2) when a data packet having a value of a transmission destination IP address 130.1.1.1 is input from the router 110-1 and one higher-order byte of the IP address is 101 to 150.

The next-hop information addition circuit 112-1 refers to a transmission destination IP address 130.1.1.1 from the data packet input to the router 110-1. Because one higher-order byte of the IP address is 101 to 150, the next transfer router becomes 110-2 and the transmission destination MAC address #110-2 is added to the data packet. The data packet is output via the switch 113-1.

The data packet output to the transmission device 120-1 is transferred to the mapping/demapping circuit 122-1 via the signaling separation/multiplexing circuit 121-1.

The mapping/demapping circuit 122-1 refers to the transmission destination MAC address of the data packet and transfers the data packet to the data path 211 corresponding to the MAC address #110-2. At this time, the data packet is converted into a data path frame.

The transmission device 120-2 receives the frame on the data path 211 in the mapping/demapping circuit 122-2 via the cross-connect element 125-2, and extracts the data packet by performing frame conversion if the frame conversion is necessary. Thereafter, the data packet or frame is output to the router 110-2 via the signaling separation/multiplexing circuit 121-2.

The data packet is transferred to the next-hop information addition circuit 112-2 via the switch 113-2 of the router 110-2. The next-hop information addition circuit 112-2 adds the MAC address of the next transfer router of the data packet as the transmission destination MAC address and outputs the data packet from the output port 201-2.

Thus, it is possible to transmit a data packet on the network router.

Although the notification of the MAC address of the next transfer router is directly provided from the centralized control device 130 to the routers 110-1 to 110-4 in the first embodiment of the present invention, the notification of the IP address of the next transfer router, etc. is provided and therefore the routers 110-1 to 110-4 may discretely acquire the next transfer MAC address using an address resolution protocol (ARP), etc.

The signaling separation/multiplexing circuit 121 may use the MAC address assigned to the centralized control device 130 as the transmission destination MAC address or use the MAC address assigned to its own transmission device 120 as the transmission destination MAC address as a criterion for determining that the packet is an input signaling packet. In addition, the feature that the transmission source address is an IP address assigned to the router 110 or that the transmission destination IP address is an address assigned to the centralized control device 130 may be used. In this manner, it is possible to determine the input signaling packet by referring to a signaling-specific identifier region.

Figure 3:
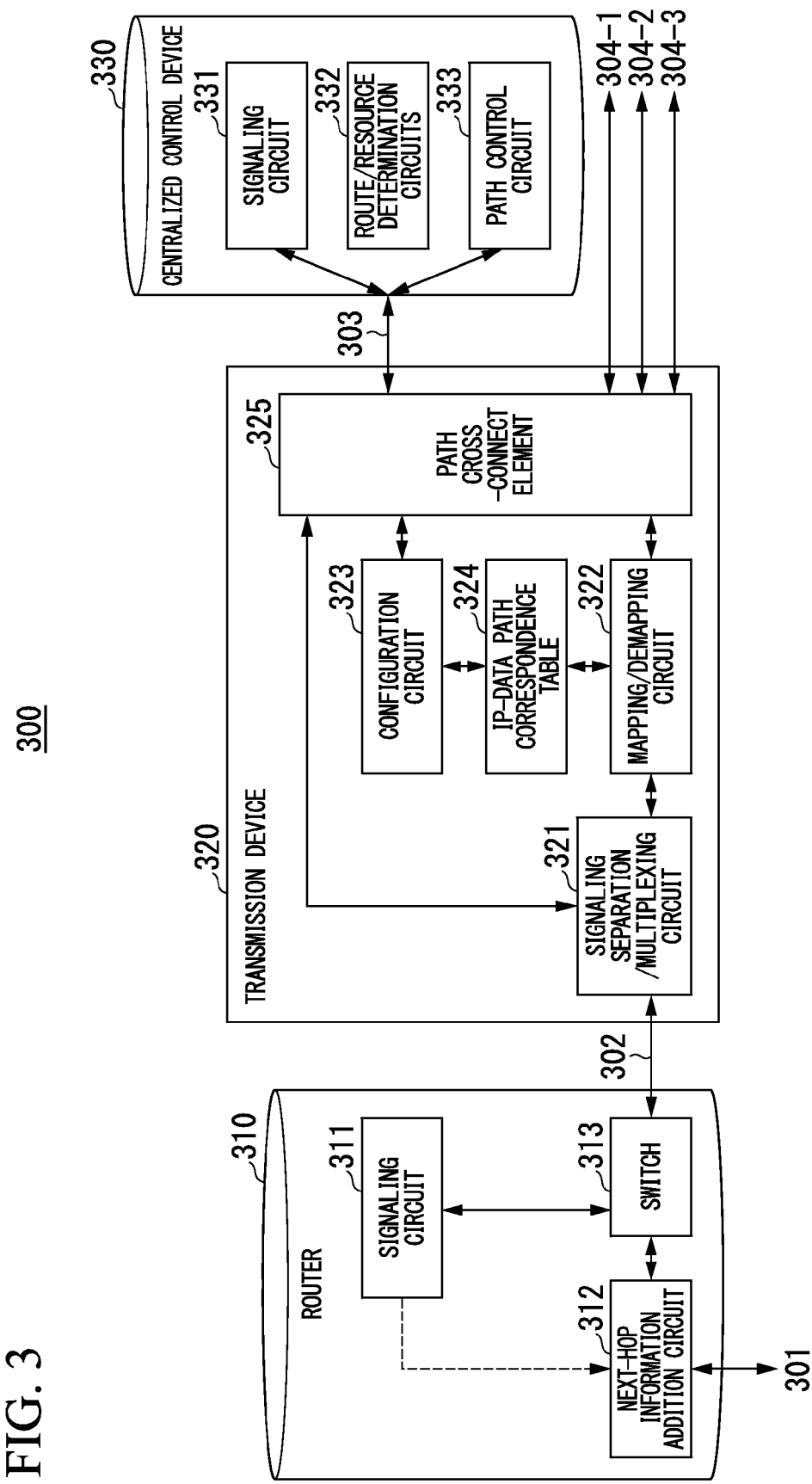
FIG. 3 is a diagram illustrating an example of a configuration of a network router according to a second embodiment of the present invention.

FIG. 3 is a diagram illustrating an example of a configuration of a network router 300 according to a second embodiment of the present invention. Although the router assigns the MAC address of the next transfer router to determine the next transfer router in the first embodiment of the invention, the router regards the transmission device as the next transfer router and the transmission device selects a data path according to a transmission destination IP address of the data packet in the second embodiment according to the invention. The network router 300 includes a router 310, a transmission device 320, and a centralized control device 330.

The router 310 includes a signaling circuit 311, a next-hop information addition circuit 312, and a switch 313.

The signaling circuit 311 manages control information such as route information and band information capable of being transferred by the router 310 and performs information exchange with a designated router/device using a designated signaling protocol. For example, an OSPF protocol or a BGP is representative as the signaling protocol.

The next-hop information addition circuit 312 is a circuit configured to add information for designating the next transfer destination router of a received packet. In the second embodiment of the present invention, a MAC address of the transmission device 320 is assigned.

The switch 313 outputs packets from the next-hop information addition circuit 312 and the signaling circuit 311 to desired ports.

The transmission device 320 includes a signaling separation/multiplexing circuit 321, a mapping/demapping circuit 322, a configuration circuit 323, an IP-data path correspondence table 324, and a path cross-connect element 325.

The signaling separation/multiplexing circuit 321 separates/multiplexes a data packet and a signaling packet.

The mapping/demapping circuit 322 terminates the MAC address added to the data packet from the signaling separation/multiplexing circuit 321, performs the association with desired data paths 304-1 to 304-3 by referring to the transmission destination IP address, and performs frame conversion for performing a transfer on the path. In addition, a frame transferred on the path is converted and restored to the data packet and the data packet is transferred to the signaling separation/multiplexing circuit 321.

The configuration circuit 323 acquires configuration information from a control path transferred from the path cross-connect element 325 and sets the IP-data path correspondence table 324 and the path cross-connect element 325.

The IP-data path correspondence table 324 is a reference table in which the correspondence between the transmission destination IP address and the data path is listed. The mapping/demapping circuit 322 refers to this table.

The centralized control device 330 includes a signaling circuit 331, a route/resource determination circuit 332, and a path control circuit 333.

The signaling circuit 331 terminates the signaling protocol from the router 310, collects route information and resource information of the router 310, and transfers the next transfer router information corresponding to the transmission destination IP address of the data packet to the router 310. In this second embodiment, the MAC address of the transmission device 320 is transferred as the next transfer router information.

The route/resource determination circuit 332 sets an optimum path route and resource allocation from path information and band information from a plurality of routers 310 and a physical topology of the network of the transmission device 320. In addition, the transmission destination IP address and the next transfer router information (the MAC address of the transmission device 320 in this example) of the data packet and the correspondence between the next transfer router information (MAC address) and the path are determined. The signaling circuit 331 refers to the transmission destination IP address and the next transfer router information (transmission destination MAC address), and the path control circuit 333 refers to the path route information, the path resource information, and the correspondence information between the transmission destination IP address and the data path.

The path control circuit 333 manages data path setup information and the correspondence between the transmission destination IP address and the data path for every transmission device 320, and notifies the transmission device 320 of the information and the correspondence.

Figure 4:
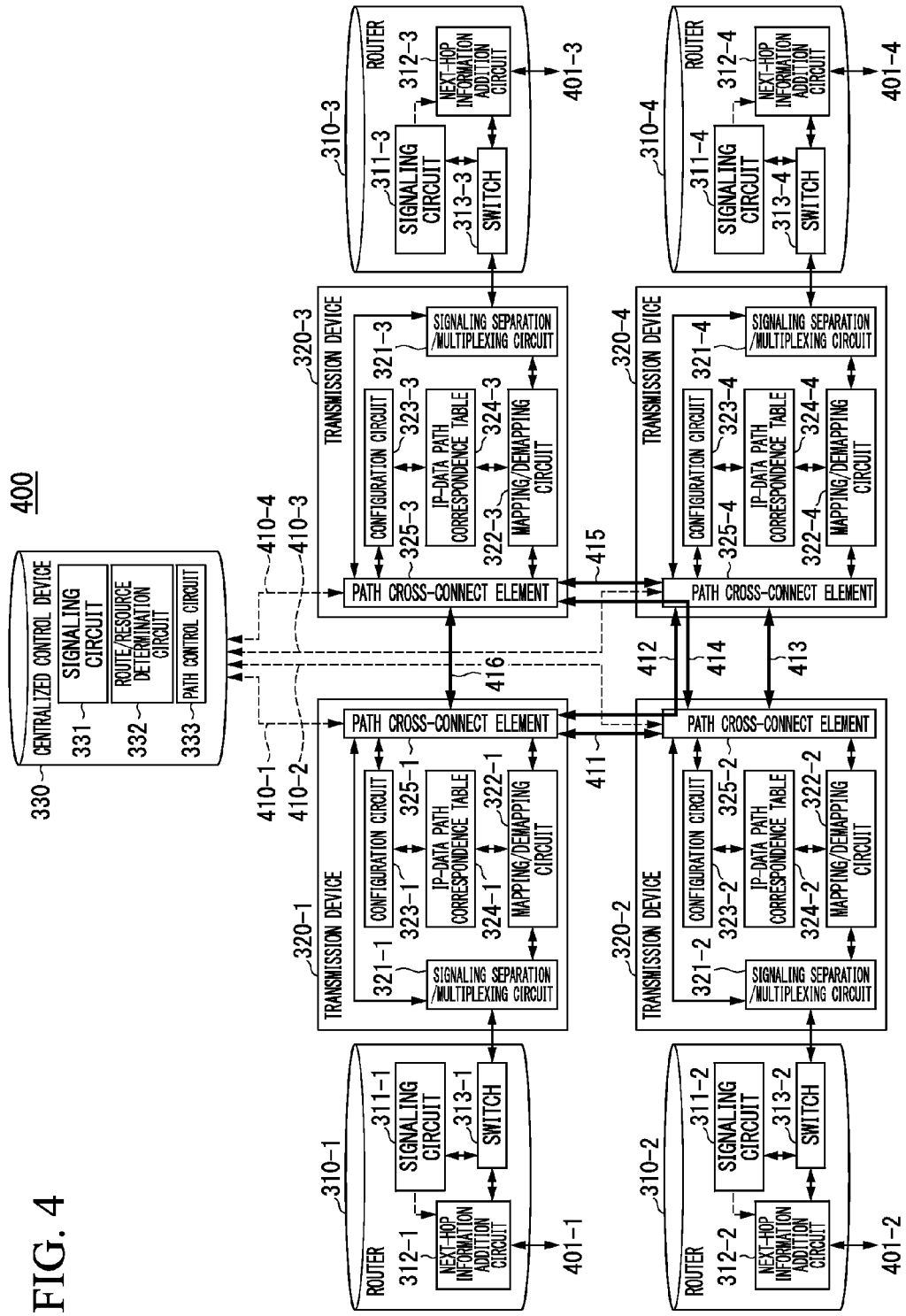
FIG. 4 is a diagram illustrating an example of a configuration of a network illustrating an operation of the network router according to the second embodiment of the present invention.

FIG. 4 is a diagram illustrating an example of a configuration of a network 400 illustrating an operation of the network router 300. The network 400 includes routers 310-1 to 310-4, transmission devices 320-1 to 320-4, and a centralized control device 330.

Control paths 410-1 to 410-4 are set up in advance between the transmission devices 320-1 to 320-4 and the centralized control device 330. To simplify description, data paths 411 to 416 are set up between the transmission devices 320-1 to 320-4 in advance.

The routers 310-1 to 310-4 start up a signaling protocol for performing a transfer within the network router before a data packet transfer.

Signaling packets from the routers 310-1 to 310-4 are transferred to the transmission devices 320-1 to 320-4 via the switches 313-1 to 313-4.

Thereafter, the signaling packets are separated by the signaling separation/multiplexing circuits 321-1 to 321-4 of the transmission devices 320-1 to 320-4. After the signaling packets have been converted into control path frames, the control path frames are transferred to the centralized control device 330 via the control paths 410-1 to 410-4 through path cross-connect elements 325-1 to 325-4.

The signaling packet reaches the signaling circuit 331 of the centralized control device 330 and therefore signaling protocol processing is performed between the signaling circuits 311 of the routers 310-1 to 310-4 and the signaling circuit 331 of the centralized control device. The route information and band information of the routers 310-1 to 310-4 included in the signaling information are transferred to the route/resource determination circuit 332.

The route/resource determination circuit 332 of the centralized control device 330 performs an optimum data path setup process based on the route/band information of the routers 310-1 to 310-4 collected via the transmission devices 320-1 to 320-4. It is possible to determine the next transfer router based on the IP address of the data packet according to the route/band information collection.

For example, the notification of 0 to 100, the notification of 101 to 150, the notification of 151 to 200, and the notification of 201 to 255 are assumed to be provided from the routers 310-1, 310-2, 310-3, and 310-4, respectively, as IP prefixes (each serving as one higher-order byte of the IP address) capable of being transferred from their own routers. In this case, for the router 310-1, a transfer to the router 310-2 is determined if the IP prefix is 101 to 150, a transfer to the router 310-3 is determined if the IP prefix is 151 to 200, and a transfer to the router 310-4 is determined if the IP prefix is 201 to 256.

The route/resource determination circuit 332 can generate the next transfer router information and notify the routers 310-1 to 310-4 of MAC addresses of the transmission devices 320-1 to 320-4 as IP address information and the next transfer router information through the signaling protocol of the signaling circuit 331.

The path control circuit 333 acquires data path setup and IP-data path correspondence information from the route/resource determination circuit 332, and notifies the transmission devices 320-1 to 320-4 of the acquired information as configuration information. At this time, of course, the information is packetized and converted into a control path frame and the control path frame is transferred on the control paths 210-1 to 210-4.

The configuration information of the notification is transferred to the configuration circuits 323-1 to 323-4 via the path cross-connect elements 325-1 to 325-4 of the transmission devices 320-1 to 320-4.

The configuration circuits 323-1 to 323-4 extract the configuration information from a packet, and register or set data path setup and MAC address-data path correspondence information according to the extracted information in their own path cross-connect elements 325-1 to 325-4 and MAC-data path correspondence tables 324-1 to 324-4.

The routers 310-1 to 310-4 receive the MAC addresses of the adjacent transmission devices 320-1 to 320-4 as the IP address information and the next transfer router information from the centralized control device 330 via the signaling protocol which operates in the signaling circuits 311-1 to 311-4.

The signaling circuits 311-1 to 311-4 register the correspondence between the IP address and the MAC address in the next-hop information addition circuits 312-1 to 312-4.

Thus, data packet transfer routes between the routers 310-1 to 310-4 are established before a data packet transfer.

Next, the data packet transfer will be described. Here, it is assumed that the router 310-2 is the next transfer router (MAC address=#310-2) when a data packet having a value of a transmission destination IP address 130.1.1.1 is input from the router 310-1 and one higher-order byte of the IP address is 101 to 150.

The next-hop information addition circuit 312 refers to a transmission destination address 130.1.1.1 from the data packet input to the router 310-1. The data packet is assigned the MAC address of the transmission device 320-1 and output via the switch 313.

The data packet output to the transmission device 320-1 is transferred to the mapping/demapping circuit 322 via the signaling separation/multiplexing circuit 321.

The mapping/demapping circuit 322 terminates the transmission destination MAC address of the data packet and determines the data path corresponding to its IP address 130.1.1.1. Because one higher-order byte of the IP address is 130, the data packet is transferred to the data path 411 for the next transfer router 310-2. At this time, the data packet is converted into a frame of the data path.

The transmission device 320-2 receives the frame on the data path 411 in the mapping/demapping circuit 422 and the data packet is extracted after frame conversion. Thereafter, the data packet is output to the router 310-2 via the signaling separation/multiplexing circuit 321.

The data packet is transferred to the next-hop information addition circuit 312-2 via the switch 313-2 of the router 310-2. The next-hop information addition circuit 312-2 adds the MAC address of the next transfer router of the data packet as the transmission destination MAC address and outputs the data packet.

Thus, it is possible to transmit a data packet on a network router.

In the embodiment of the present invention, the assignment of the MAC address of the next transfer destination router may be performed by any one of the mapping/demapping circuits 323 of the transmission devices 320 serving as a transmission source/reception destination.

The signaling separation/multiplexing circuit 321 may use the MAC address assigned to the centralized control device 330 as the transmission destination MAC address or use the MAC address assigned to its own transmission device 320 as the transmission destination MAC address as a criterion for determining that the packet is an input signaling packet. In addition, the feature that the transmission source address is an IP address assigned to the router 310 or that the transmission destination IP address is an address assigned to the centralized control device 330 may be used. In any case, the determination is made by referring to a signaling-specific identifier region.

Figure 5:
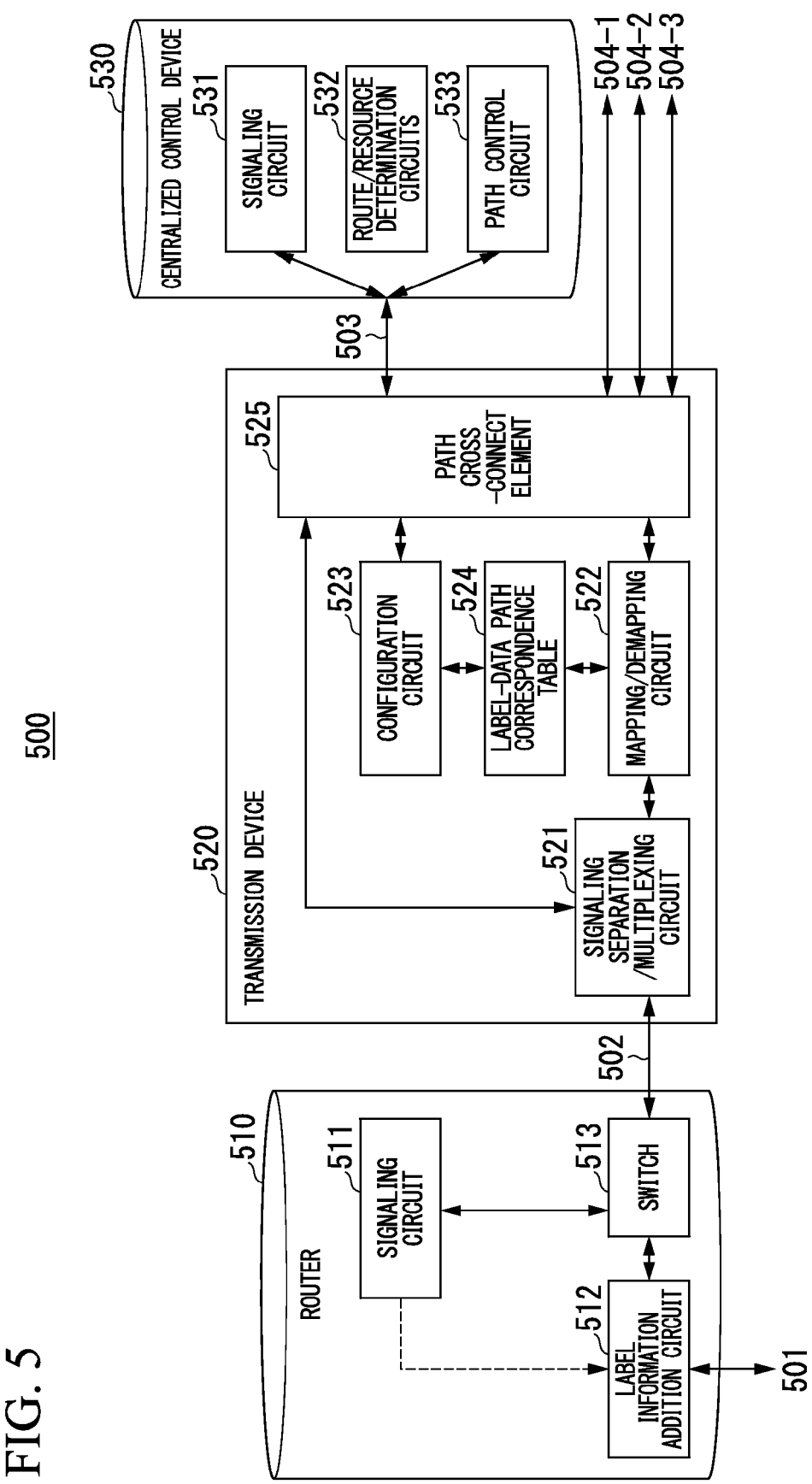
FIG. 5 is a diagram illustrating an example of a configuration of a network router according to a third embodiment of the present invention.

FIG. 5 is a diagram illustrating an example of a configuration of a network router 500 according to a third embodiment of the present invention. Although the IP router is mainly targeted as an edge of the network router in the first and second embodiments of the invention, an IP/MPLS router is targeted in the third embodiment of the invention. The construction of a relation between the label of the IP/MPLS router and the data path is a main difference. When the MAC address of the next transfer destination IP/MPLS router is clearly indicated in the IP/MPLS router, the first embodiment of the present invention is applied. The network router includes a router 510, a transmission device 520, and a centralized control device 530.

The router 510 includes a signaling circuit 511, a label information addition circuit 512, and a switch 513.

The signaling circuit 511 manages control information such as route information and band information capable of being transferred by the router 510 and performs information exchange with a designated router/device using a designated signaling protocol. For example, an OSPF protocol and a label distribution protocol (LDP) or a BGP and the LDP are representative as the signaling protocol.

The label information addition circuit 512 is a circuit configured to add an MPLS label to a received packet or change an MPLS label of the received packet. It is possible to remove the MPLS label from the packet transferred from the switch 513.

The switch 513 outputs packets from the label information addition circuit 512 and the signaling circuit 511 to desired ports.

The transmission device 520 includes a signaling separation/multiplexing circuit 521, a mapping/demapping circuit 522, a configuration circuit 523, a label-data path correspondence table 524, and a path cross-connect element 525.

The signaling separation/multiplexing circuit 521 separates/multiplexes a data packet and a signaling packet.

The mapping/demapping circuit 522 terminates a MAC address of a data packet from the signaling separation/multiplexing circuit 521, performs the association with desired data paths 504-1 to 504-3 by referring to an MPLS label, and performs frame conversion for performing a transfer on the paths. The frame transferred on the path is converted and restored to the data packet and the data packet is transferred to the signaling separation/multiplexing circuit 521.

The configuration circuit 523 acquires configuration information from the control path 503 transferred from the path cross-connect element 525 and sets the label-data path correspondence table 524 and the path cross-connect element 525.

The label-data path correspondence table 524 is a reference table in which the correspondences between the MPLS labels and the data paths 504-1 to 504-3 are listed. The mapping/demapping circuit 522 refers to this table.

The centralized control device 530 includes a signaling circuit 531, a route/resource determination circuit 532, and a path control circuit 533.

The signaling circuit 531 terminates the signaling protocol from the router 510, collects route information, MPLS label information, and resource information of the router 510, and assigns a data packet to the router 510 or transfers changed label information to the router 510.

The route/resource determination circuit 532 determines an optimum path route and resource allocation from route information, band information, and MPLS label information from a plurality of routers 510 and a physical topology of the network of the transmission device 520. In addition, the association of the MPLS label and the data path of the data packet is determined. The route/resource determination circuit 532 refers to the output MPLS label information of the router 510, and the path control circuit 533 refers to the correspondence between the input MPLS label information and the data path and data path setup information for the transmission device 520.

The path control circuit 533 manages the correspondence between the MPLS label and the transmission data path for every transmission device 520, and notifies the transmission device 520 of the correspondence.

Figure 6:
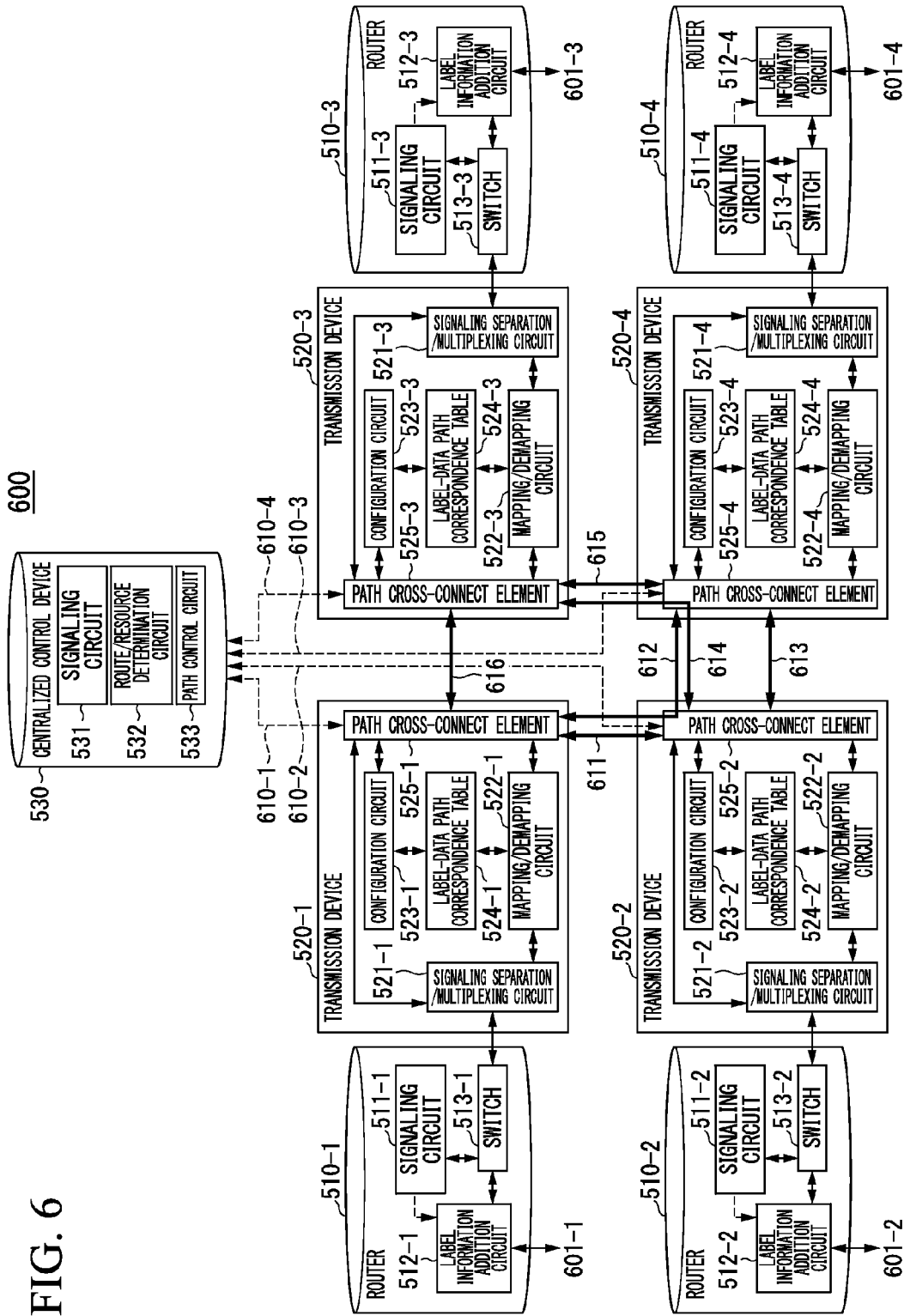
FIG. 6 is a diagram illustrating an example of a configuration of a network illustrating an operation of the network router according to the third embodiment of the present invention.
Figure 7:
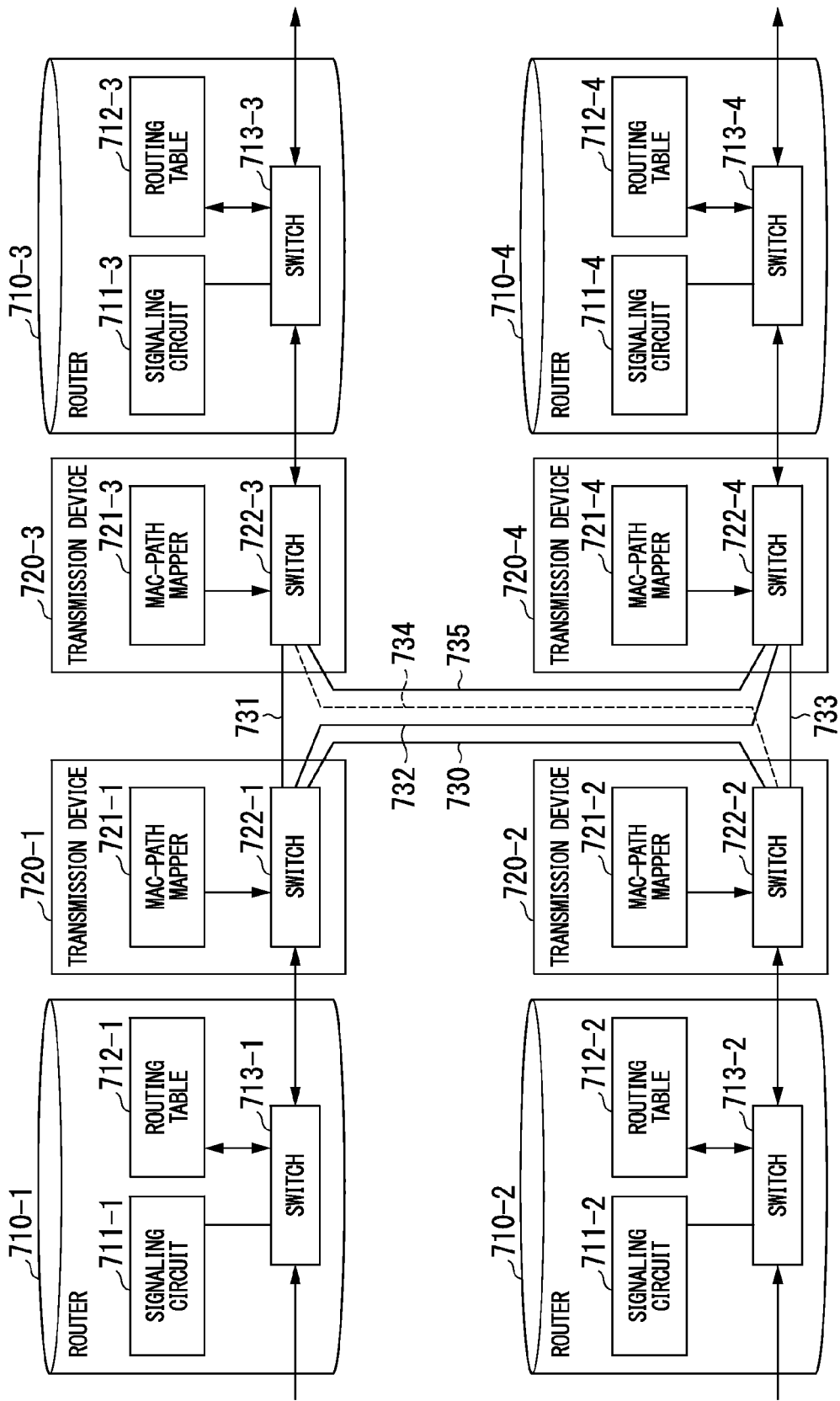
FIG. 7 is a network configuration example of the related art.

FIG. 6 is a diagram illustrating an example of a configuration of a network 600 illustrating an operation of the network router 500. The network 600 includes routers 510-1 to 510-4, transmission devices 520-1 to 520-4, and a centralized control device 530.

Control paths 610-1 to 610-4 are set up in advance between the transmission devices 520-1 to 520-4 and the centralized control device 530. To simplify description, data paths 611 to 616 are set up between the transmission devices 520-1 to 520-4 in advance.

The routers 510-1 to 510-4 start up a signaling protocol for performing a transfer within the network router before a data packet transfer.

Signaling packets from the routers 510-1 to 510-4 are transferred to the transmission devices 520-1 to 520-4 via the switches 513-1 to 513-4.

The signaling packets from the routers 510-1 to 510-4 are separated by the signaling separation/multiplexing circuits 521-1 to 521-4 of the transmission devices 520-1 to 520-4. After the signaling packets have been converted into control path frames, the control path frames are transferred to the centralized control device 530 via the control paths 610-1 to 610-4 through path cross-connect elements 525-1 to 525-4.

The signaling packet reaches the signaling circuit 531 of the centralized control device 530 and therefore signaling protocol processing is performed between the signaling circuits 511-1 to 511-4 of the routers 510-1 to 510-4 and the signaling circuit 531 of the centralized control device. The route information, label information, and band information of the routers 510-1 to 510-4 included in the signaling information are transferred to the route/resource determination circuit 532.

The route/resource determination circuit 532 of the centralized control device 530 performs optimum data path setup and resource allocation based on the route/band information of the routers 510-1 to 510-4 collected via the transmission devices 520-1 to 520-4. Output MPLS label values of data packets of the routers 510-1 to 510-4 are determined according to the route/band information collection. Simultaneously, the MPLS label input value and the transfer destination router for each of the transmission devices 520-1 to 520-4 are determined and consequently the correspondence between the MPLS label value and the data path can be determined.

In this operation, an example in which the router 510-1 performs IP packet-MPLS conversion will be described in detail. The router 510-2 assumes that notification of 0 to 100 is provided as an IP prefix (assumed to be one higher-order byte of the IP address) capable of being transferred from the router 510-2. When an inter-router path of the MPLS label 500 is set up between the routers 510-1 and 510-2, the "centralized control device 530 assigns an MPLS label 500 to an input data packet of an IP prefix of 0 to 100 for the router 510-1. Upon receiving the data packet of the MPLS label 500, the transmission device 520-1 transfers the received data packet to the data path 611. The transmission device 520-2 determines to transfer the data packet of the MPLS label 500 from the data path 611 to the router 510-2". According to this process, a data packet transfer route from the router 510-1 to the router 510-2 is established.

The route/resource determination circuit 532 creates the transmission destination IP address-MPLS label correspondence and a reception MPLS label-transmission MPLS label correspondence table for each of the routers 510-1 to 510-4, and provides the notification of the created correspondence and correspondence table through the signaling protocol of the signaling circuit 531. In addition, the reception MPLS label and data path correspondence table and the data path setup information are created for each of the transmission devices 520-1 to 520-4 and the notification of the created correspondence table and information is provided through the path control circuit 533.

Upon acquiring configuration information from the centralized control device 530, the configuration circuits 523-1 to 523-4 of the transmission devices 520-1 to 520-4 update the settings of the path cross-connect elements 525-1 to 525-4 and label-data correspondence tables 524-1 to 524-4.

The routers 510-1 to 510-4 receive transmission destination IP address-MPLS label correspondence information and input/output (I/O) MPLS label correspondence information from the centralized control device 530 via a signaling protocol which operates in the signaling circuits 511-1 to 511-4.

The signaling circuits 511-1 to 511-4 register transmission destination IP addresses or the correspondence between reception label information and transmission label information in the label information addition circuit 512-1 to 512-4.

According to the above, data packet transfer routes between the routers 510-1 to 510-4 are established before a data packet transfer.

Next, the data packet transfer will be described. Here, it is assumed that a data packet of an MPLS label #100 is input to the router 510-1 and the MPLS label #100 is converted into an MPLS label #101 and transferred to the router 510-2.

For the data packet input to the router 510-1, the received MPLS label #100 is referred to in the label information addition circuit 511. Thereafter, the label is changed to the MPLS label #101 and output via the switch 513.

The data packet output to the transmission device 520-1 is transferred to the mapping/demapping circuit 522 via the signaling separation/multiplexing circuit 521.

The mapping/demapping circuit 522 terminates the transmission destination MAC address of the data packet and determines a data path corresponding to the MPLS label #101. For the transfer to the router 510-2, the transfer to the data path 611 is performed. At this time, frame conversion may be performed according to a protocol of the path.

The transmission device 520-2 receives the frame on the data path 611 in the mapping/demapping circuit 622, and extracts the data packet by performing frame conversion if the frame conversion is necessary. Thereafter, the data packet or frame is output to the router 510-2 via the signaling separation/multiplexing circuit 521.

The data packet is transferred to the label information addition circuit 512-2 via the switch 513-2 of the router 510-2. The label information addition circuit 512-2 changes a label value of the data packet and outputs the data packet with the changed label value.

Thus, it is possible to transmit a data packet on the network router.

According to a first advantageous effect in the present invention, it is possible to reduce a signaling processing amount of each router. This is because a centralized controlled device capable of processing signaling is disposed within a network and each router executes a signaling process only with the centralized control device. Although there is an adjacent router from the viewpoint of a data transfer, the centralized control device is a unique adjacent router from the viewpoint of a signaling process. Because the centralized controlled device can be separated from the router and the transmission device without participating in the data transfer, the limitations of CPU performance and the number of elements to be mounted are small. Thus, a high load is not particularly problematic in a signaling processing amount.

According to a second advantageous effect of the present invention, it is possible to provide a service without discarding a packet by following route information even when the route information is dynamically generated between routers. This is because the centralized control device can acquire information through signaling with each router and reflect an acquisition result in the transmission device.

For example, even when an MPLS label change or the like frequently occurs between IP/MPLS routers, the correspondence between a value after the MPLS label change and a data path can be immediately constructed.

According to a third advantageous effect of the present invention, quality degradation does not occur even when band allocation, a traffic class change, or the like is performed using signaling between routers. As in the second advantageous effect, this is because the centralized control device can acquire information through signaling with each router and reflect an acquisition result in the transmission device.

According to a fourth advantageous effect of the present invention, it is possible to simplify a data transfer device by completely separating a signaling processing device from the data transfer device.

Although some or all of the above-described embodiments are described as in the following Supplementary Notes, the present invention is not limited to the following.

(Supplementary Note 1)

In a network system, client setting information to be determined by the route/resource determination circuit of the centralized control device is an IP address or a MAC address of the next transfer client node for each piece of the data information.

(Supplementary Note 2)

In the network system, when the client setting information of the notification is an IP address of the next transfer client node for each piece of the data information, the signaling circuit of the client node calculates a transmission destination MAC address from the IP address and the next-hop information addition circuit is notified of the correspondence between the MAC address and the data information.

(Supplementary Note 3)

In the network system, network information assigned by the next-hop information addition circuit is the MAC address of the data information set from the signaling circuit.

(Supplementary Note 4)

In the network system, network setting information received by the configuration circuit is relation information between a MAC address of data information and a data path to be accommodated and registered in a network information-data path correspondence table of the data information.

(Supplementary Note 5)

In the network system, a determination criterion when the signaling separation/multiplexing circuit separates signaling information is a case in which a transmission source IP address is an IP address of the client node, the transmission destination IP address is an IP address of the transmission device, the transmission destination IP address is an IP address of the centralized control device, the transmission source MAC address is a MAC address of the client node, the transmission destination MAC address is a MAC address of the transmission device, or the transmission destination MAC address is a MAC address of the centralized control device.

(Supplementary Note 6)

In the network system, when network information of all data information in client setting information determined by the route/resource determination circuit is designated as a MAC address of the transmission device and network setting information is correspondence information between a transmission destination IP address and a data path of the data information, the configuration circuit of the transmission device registers the correspondence between the IP address which is the network information of the data information and the data path information in the network information-data path correspondence table, the signaling circuit of the client node registers the MAC address of the transmission device as network information of the data information in the next-hop information addition circuit, and the next-hop information addition circuit adds the registered MAC address.

(Supplementary Note 7)

In the network system, a determination criterion when the signaling separation/multiplexing circuit separates signaling information is a case in which a transmission source IP address is an IP address of the client node, the transmission destination IP address is an IP address of the transmission device, the transmission destination IP address is an IP address of the centralized control device, the transmission source MAC address is a MAC address of the client node, the transmission destination MAC address is a MAC address of the transmission device, or the transmission destination MAC address is a MAC address of the centralized control device.

(Supplementary Note 8)

A network system which performs data exchange between nodes connecting client nodes includes:

the client node including:

a signaling circuit configured to exchange signaling information and acquire client setting information;

a next-hop information addition circuit configured to add network information based on the setting information of the signaling circuit; and a switch configured to switch the data information and the signaling information from the signaling circuit, a label information addition circuit, and a network input port;

a centralized control device including:

a signaling circuit configured to exchange the signaling information with the client node through a control path;

a route/resource determination circuit configured to determine a data information transfer route and notify the signaling circuit of the client setting information; and a path control circuit configured to provide notification of network setting information from the route/resource determination circuit through the control path; and a transmission device including:

a configuration circuit configured to set the network setting information of the notification from the path control circuit of the centralized control device through the control path set up with the centralized control device;

a data information-data path correspondence table of the network setting information from the configuration circuit;

a mapping/demapping circuit configured to perform data information mapping and demapping between the data information and the data path by referring to the data information-data path correspondence table;

a path cross-connect element configured to perform a cross-connect operation on the control path and the data path based on setting from the configuration circuit; and a signaling separation/multiplexing circuit configured to separate the data information and the signaling information from the client node, transmit the signaling information to the control path, transmit the data information to the mapping/ demapping circuit, and multiplex the signaling information from the control path and the data information from the mapping/demapping circuit to output the multiplexed information.

(Supplementary Note 9)

In the network system, one centralized control device is disposed for a plurality of transmission devices.

(Supplementary Note 10)

In the network system, the client setting information determined by the route/resource determination circuit of the centralized control device is label information of the next transfer client node for each piece of the data information.

(Supplementary Note 11)

In the network system, the network information assigned by the label information addition circuit is a label of the data information set from the signaling circuit.

(Supplementary Note 12)

In the network system, network setting information received by the configuration circuit is relation information between a label added to the data information and a data path to be accommodated and is registered in the label-data path correspondence table.

(Supplementary Note 13)

In the network system, a determination criterion when the signaling separation/multiplexing circuit separates signaling information is a case in which a transmission source IP address is an IP address of the client node, the transmission destination IP address is an IP address of the transmission device, the transmission destination IP address is an IP address of the centralized control device, the transmission source MAC address is a MAC address of the client node, the transmission destination MAC address is a MAC address of the transmission device, or the transmission destination MAC address is a MAC address of the centralized control device.

Although the present invention has been described with reference to embodiments, the technical scope of the present invention is not limited to the scope of the abovementioned embodiments. It is apparent to those skilled in the art that various alterations and improvements can be made to the abovementioned embodiments. It is apparent from the appended claims that embodiments with the various alterations and improvements will be included in the technical scope of the present invention.

Priority is claimed on Japanese Patent Application No. 2011-200294, filed Sep. 14, 2011, the content of which is incorporated herein by reference.

INDUSTRIAL APPLICABILITY

According to a network system related to the present invention, it is possible to perform data exchange between nodes connecting client nodes.

DESCRIPTION OF REFERENCE SYMBOLS

100 Network router
101, 102 I/O port
103 Control path
104-1, 104-2, 104-3 Data path
110 Router
111 Signaling circuit
112 Next-hop information addition circuit
113 Switch
120 Transmission device
121 Signaling separation/multiplexing circuit
122 Mapping/demapping circuit
123 Configuration circuit
124 MAC-data path correspondence table
125 Path cross-connect element
130 Centralized control device
131 Signaling circuit
132 Route/resource determination circuit
133 Path control circuit
210-1, 210-2, 210-3, 210-4 Control path
211, 212, 213, 214, 215, 216 Data path
300 Network router
301, 302 I/O port
303 Control path
304-1, 304-2, 304-3 Data path
310 Router
311 Signaling circuit
312 Next-hop information addition circuit
313 Switch
320 Transmission device
321 Signaling separation/multiplexing circuit
322 Mapping/demapping circuit
323 Configuration circuit
325 Path cross-connect element
330 Centralized control device
331 Signaling circuit
332 Route/resource determination circuits
333 Path control circuit
410-1, 410-2, 410-3, 410-4 Control path
401-1, 401-2, 401-3, 401-4 I/O port
411, 412, 413, 414, 415, 416 Data path
500 Network router
501, 502 I/O port
503 Control path
504-1, 504-2, 504-3 Data path
510 Router
511 Signaling circuit
513 Switch
520 Transmission device
521 Signaling separation/multiplexing circuit
522 Mapping/demapping circuit
523 Configuration circuit
525 Path cross-connect element
530 Centralized control device
531 Signaling circuit
532 Route/resource determination circuit
533 Path control circuit
601-1, 601-2, 601-3, 601-4 I/O port
610-1, 610-2, 610-3, 610-4 Control path
611, 612, 613, 614, 615, 616 Data path

The invention claimed is:

1. A network system which performs data exchange between nodes connecting client nodes, the network system comprising:
a signaling network configured to perform signaling information exchange with the client nodes, determine a data information transfer route, and generate setting information of the client nodes; and
a data network configured to construct the data information transfer route according to the setting information from the signaling network and perform the data exchange between the client nodes.

2. The network system according to claim 1, wherein the signaling network and the data network are physically separated.

3. A network system which performs data exchange between nodes connecting client nodes, the network system comprising:

a centralized control device configured to exchange signaling information with the client nodes, determine a data information transfer route, and generate setting information; and a transmission device configured to construct the data information transfer route according to the setting information from the centralized control device and perform the data exchange between the client nodes.

4. The network system according to claim 3, wherein one centralized control device is disposed for a plurality of transmission devices.

5. A network system which performs data exchange between nodes connecting client nodes, the network system comprising:

a centralized control device configured to exchange signaling information with the client nodes through a control path, determine a data information transfer route, and generate setting information; and a transmission device configured to set up the control path with the centralized control device, transmit the signaling information from the client node to the control path, construct a data path according to the setting information from the centralized control device received through the control path, transmit data from the client node using the data path, and transfer the signaling information and data information received from the control path and the data path to the client node.

6. The network system according to claim 5, wherein one centralized control device is disposed for a plurality of transmission devices.

7. A network system which performs data exchange between nodes connecting client nodes, the network system comprising:

a centralized control device including:

a signaling circuit configured to exchange signaling information with the client node through a control path;

a route/resource determination circuit configured to determine a data information transfer route and notify the signaling circuit of client setting information; and a path control circuit configured to provide notification of network setting information from the route/resource determination circuit through the control path; and a transmission device including:

a configuration circuit configured to set the network setting information of the notification from the path control circuit of the centralized control device through the control path set up with the centralized control device;

a data information-data path correspondence table registered from the configuration circuit;

a mapping/demapping circuit configured to perform data information mapping and demapping between data information and a data path by referring to the data information-data path correspondence table;

a path cross-connect element configured to perform a cross-connect operation on the control path and the data path based on setting from the configuration circuit; and a signaling separation/multiplexing circuit configured to separate the data information and the signaling information from the client node, transmit the signaling information to the control path, transmit the data information to the mapping/demapping circuit, and multiplex the signaling information from the control path and the data information from the mapping/demapping circuit to output the multiplexed information.

8. The network system according to claim 7, wherein one centralized control device is disposed for a plurality of transmission devices.

9. A network system which performs data exchange between nodes connecting client nodes, the network system comprising:

the client node including:

a signaling circuit configured to exchange signaling information and acquire client setting information;

a next-hop information addition circuit configured to add network information based on the setting information of the signaling circuit; and a switch configured to switch the data information and the signaling information from the signaling circuit, the next-hop information addition circuit, and a network input port;

a centralized control device including:

a signaling circuit configured to exchange the signaling information with the client node through a control path;

a route/resource determination circuit configured to determine a data information transfer route and notify the signaling circuit of the client setting information; and a path control circuit configured to provide notification of network setting information from the route/resource determination circuit through the control path; and a transmission device including:

a configuration circuit configured to set the network setting information of the notification from the path control circuit of the centralized control device through the control path set up with the centralized control device;

a data information-data path correspondence table of the network setting information from the configuration circuit;

a mapping/demapping circuit configured to perform data information mapping and demapping between the data information and the data path by referring to the data information-data path correspondence table;

a path cross-connect element configured to perform a cross-connect operation on the control path and the data path based on setting from the configuration circuit; and a signaling separation/multiplexing circuit configured to separate the data information and the signaling information from the client node, transmit the signaling information to the control path, transmit the data information to the mapping/demapping circuit, and multiplex the signaling information from the control path and the data information from the mapping/demapping circuit to output the multiplexed information.

10. The network system according to claim 9, wherein one centralized control device is disposed for a plurality of transmission devices.

* * * * *